Dec. 5, 1933.  B. D. BEDFORD  1,938,367
ELECTRIC VALVE CONVERTING APPARATUS
Filed Aug. 31, 1932
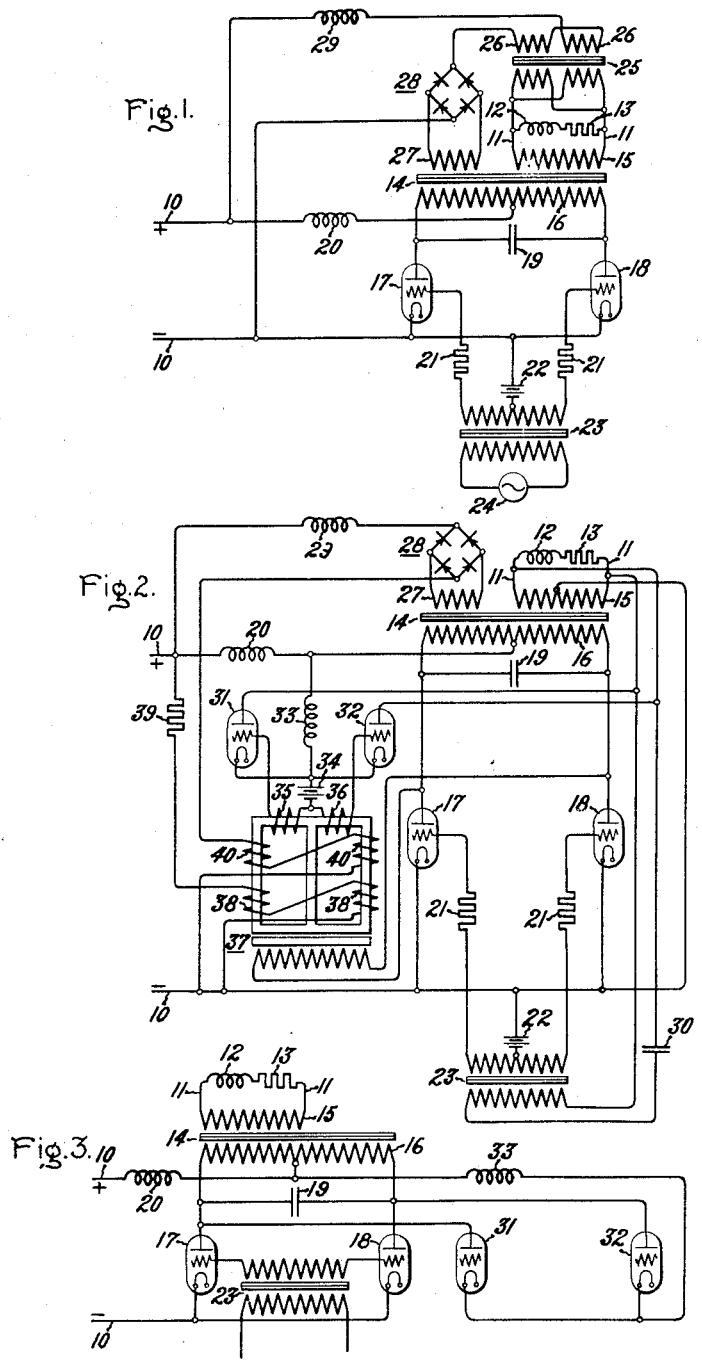
Inventor:
Burnice D. Bedford,
by Charles E. Taller
His Attorney.

Patented Dec. 5, 1933

1,938,367

UNITED STATES PATENT OFFICE 1,938,367

ELECTRIC VALVE CONVERTING APPARATUS

Burnice D. Bedford, Schenectady, N. Y., assignor to General Electric Company, a corporation of New York Application August 31, 1932. Serial No. 631,227

11 Claims. (Cl. 175—363)

My invention relates to electric valve converting apparatus and more particularly to such apparatus for transmitting energy from a source of direct current to an alternating current circuit subject to substantial load variations.

In the operation of electric valve converting apparatus for transmitting energy from a direct current circuit to an alternating current circuit, known in the art as inverters, some difficulty has been encountered under light load conditions when excessive voltages tend to appear on the alternating current circuit. This is true of both the parallel inverters such as disclosed in United States Letters Patent No. 1,800,002, granted April 7, 1931, upon the application of E. F. W. Alexanderson, and series inverters of the type illustrated in United States Letters Patent No. 1,752,247, granted March 25, 1930, upon the application of A. S. FitzGerald. These difficulties are particularly noticeable when the inverter circuit includes a considerable amount of capacitance which may tend to set the apparatus into oscillation under light load conditions.

It is an object of my invention, therefore, to provide a new and improved electric valve converting apparatus for transmitting energy from a direct current circuit to an alternating current circuit subject to substantial load variations which will overcome the above mentioned disadvantages of the arrangements of the prior art, and which will be simple and reliable in operation.

It is another object of my invention to provide an improved electric valve converting apparatus for transmitting energy from a direct current circuit to an alternating current circuit subject to substantial load variations, by means of which any desired voltage regulation characteristics may be obtained on the alternating current circuit.

It is a further object of my invention to provide an improved electric valve converting apparatus for transmitting energy from a direct current circuit to an alternating current circuit subject to substantial load variations in which the voltage on the alternating current circuit may be maintained substantially constant.

In accordance with my invention, an electric valve converting apparatus for transmitting energy from a direct current supply circuit to an alternating current load circuit subject to substantial load variations is provided with means for loading the converting apparatus independently of the alternating current circuit to control the voltage thereof, and means responsive to an electrical condition of the converting apparatus for regulating the loading means. In accordance with one embodiment of my invention, the loading means comprises a saturable reactor connected across the load circuit, and there is provided an arrangement for saturating the reactor in response to variations in the voltage of the alternating current circuit. In accordance with another modification of my invention, there is provided an auxiliary rectifier, which may be arranged either to feed back energy to the direct current circuit or to be short-circuited through a reactance device. In either case, the rectifier may be grid-controlled in accordance with variations in the voltage of the alternating current circuit to determine its regulating effect on the voltage of the alternating current circuit.

For a better understanding of my invention, together with other and further objects thereof, reference is had to the following description taken in connection with the accompanying drawing and its scope will be pointed out in the appended claims. Fig. 1 of the accompanying drawing illustrates an embodiment of my invention in which the converting apparatus is loaded by means of a saturable reactor; Fig. 2 shows a modification of my invention in which the control is effected by means of an auxiliary rectifier connected to feed back energy to the direct current circuit, while Fig. 3 illustrates a further modification in which the auxiliary rectifier is short-circuited through an impedance device.

Referring now more particularly to Fig. 1 of the drawing, there is illustrated an arrangement for transmitting energy from a direct current supply circuit 10 to an alternating current circuit 11 to which is connected a variable load device indicated schematically as an inductance device 12 and a resistor 13. This apparatus comprises a transformer 14 provided with a secondary winding 15 connected to the alternating current circuit 11, and a primary winding 16 provided with an electrical midpoint connected to one side of the direct current circuit, and with end terminals connected to the other side of the direct current circiut through electric valves 17 and 18. Electric valves 17 and 18 are each provided with an anode, a cathode and a control grid and may be of any of the several types well known in the art, although I prefer to utilize valves of the vapor electric discharge type. A commutating capacitator 19 is connected between the anodes of the valves 17 and 18 and a smoothing reactor 20 is preferably included in the direct current circuit, as illustrated. In order periodically to render the valves 17 and 18 alternately conductive and non-conductive, their grids are connected to their common cathode circuit through current limiting resistors 21, a negative bias battery 22 and opposite halves of the secondary winding of a grid transformer 23, the primary winding of which may be energized from any suitable source of alternating current 24 of a frequency which it is desired to supply to the circuit 11. In order to control the voltage of the alternating current circuit 11 under light load conditions, the reactive windings of a saturable reactor 25, provided with saturating windings 26, are connected across the alternating current circuit 11, while the saturating windings 26 are connected to be energized from the difference between the potential of the direct current circuit 10 and a unidirectional potential variable in accordance with the voltage of the alternating current circuit. This potential difference may be supplied, for example, by means of an auxiliary winding 27 on the transformer 14 and a rectifying circuit 28 comprising a plurality of contact rectifiers, as illustrated. The energizing circuit of the saturating winding 26 may include a smoothing reactor 29, if desired.

The general principles of operation of the above described inverter will be well understood by those skilled in the art. In brief, if one of the valves, for example, the valve 17, is initially rendered conductive, current will flow through the left-hand portion of the winding 16 and electric valve 17, inducing one-half cycle of alternating current in the transformer 14. During this interval the capacitor 19 becomes charged to substantially twice the potential of the direct current circuit, and, when the grid potential supplied by the transformer 23 reverses polarity to render the valve 18 conductive, the potential of capacitor 19 is effective to commutate the current from the valve 17 to the valve 18. Current now flows through the right-hand portion of the winding 16 inducing a half cycle of alternating current of opposite polarity in the transformer 12. In this manner the current is successively commutated between the valves 17 and 18 and an alternating current supplied to the circuit 11.

Under normal operating conditions, when the voltage of the alternating current circuit 11 is at or below normal, the unidirectional voltage supplied by the winding 27 to rectifying means 28 is less than that of the supply circuit 10 and, because of the unilateral conductivity of the rectifying means 28 no current will flow in the saturating windings 26 of the reactor 25. This reactor, when unsaturated, is designed to have a very high impedance so that its effect upon the converting apparatus as a whole, is very small. Should the energy drawn by the load devices 12 and 13 decrease substantially, the capacitor 19 may tend to oscillate with the leakage reactance of the transformer 14 and the smoothing reactor 20 to produce excessive voltages on the alternating current circuit 11. However, when the voltage of circuit 11 rises above normal, the winding 27 and rectifier 28 produce a unidirectional potential greater than that of the direct current circuit 10 and the difference potential is effective to saturate the reactor 25. As reactor 25 becomes saturated, its impedance decreases with the result that it acts as a load on the alternating current circuit 11 effective to maintain the voltage thereof at its normal value. By properly proportioning the several elements of the saturable reactor circuit, the apparatus may be given any desired voltage regulation characteristic. It will also be obvious that, in case the voltage relations are proper, the saturating winding 26 may be energized through the rectifier 28 from the alternating current circuit 11 rather than from the auxiliary winding 27.

In the arrangement of Fig. 2 the means for loading the alternating current circuit 11 comprises an auxiliary rectifier connected to feed back energy to the direct current circuit 10. The inverter in this arrangement is similar to that illustrated in Fig. 1 with the exception that it is self-excited, that is, the primary winding of grid transformer 23 is energized directly from the alternating current circuit 11 through a phase advancing capacitor 30. The auxiliary rectifier comprises three electrode vapor electric valves 31 and 32 connected with the winding 15 to form a full wave rectifier supplying current to the direct current circuit 10 through a smoothing reactor 33, as illustrated. In order to control the rectifier comprising the valves 31 and 32, and thus the loading of the alternating current circuit 11, the grids of the valves 31 and 32 are connected to their common cathode circuit through a negative bias battery 34 and secondary windings 35 and 36, respectively, of a saturable grid transformer 37, the primary winding of which is energized across the winding 16. The effect of the saturable grid transformer is to convert the alternating potential of substantially sinusoidal wave form into one of peaked wave form, which has been found particularly suitable for exciting valves of the vapor electric discharge type. The magnetic core member of the transformer 37 is also supplied with a saturating winding 38 energized from the direct current circuit 10 through a current limiting resistor 39 and with a saturating winding 40 energized with the difference potential between the direct current circuit 10 and that of the rectifying means 28. This arrangement of saturating windings is effective to shift the phase of the peaked grid potential supplied to valves 31 and 32 in accordance with variations in the voltage of the alternating current circuit 11, although this feature of shifting the phase of a periodic potential of peaked wave form by means of independent saturating windings on a saturable transformer forms no part of my present invention but is disclosed and broadly claimed in my copending application, Serial No. 564,623, filed September 23, 1931, and assigned to the same assignee as the present application.

The operation of the inverting apparatus per se of Fig. 2 is similar to that described in connection with the apparatus of Fig. 1. Under normal operating conditions the winding 38 of the grid transformer 37 produces a predetermined biasing magnetomotive force to shift the phase of the alternating potential of peaked wave form supplied to the grids of the valves 31 and 32 to maintain these valves substantially non-conducting. Under these conditions, as in the arrangement of Fig. 1, the voltage supplied by the rectifying means 28 is less than that of the direct current circuit 10 so that saturating windings 40 are deenergized.

Under light load conditions, however, the voltage supplied by the rectifying means 28 is greater than that of the direct current circuit 10 and is effective to energize the windings 40, which are differentially connected with respect to the winding 38, and tends to desaturate the magnetic core member of the transformer 37. As the unidirectional saturation is decreased, the point in the cycle of alternating potential at which the resultant magnetomotive force reverses polarity in the magnetic core of the transformer 37, and thus the phase of the peaked potential supplied to the grids of the valves 31 and 32 is advanced to increase the conductivity of the valves 31 and 32 and to transfer energy from the alternating current circuit 11 back to the direct current circuit 10. With continued rise in voltage on the alternating current circuit 11, the conductivity of the rectifying valves 31 and 32 is successively increased to maintain a substantially constant voltage on the alternating current circuit 11, thus effectively circulating energy through the converting apparatus under light load conditions.

The arrangement of Fig. 3 is similar to that of Fig. 2, with the exception that the auxiliary rectifier comprising the valves 31 and 32 is connected to be short-circuited through the reactance device 33 rather than to feed back energy to the direct current circuit 10, so that when the valves 31 and 32 are conductive the auxiliary rectifier comprises an inductive load on the alternating current circuit. This auxiliary load is made still more reactive by the fact that the grids of the valves 31 and 32 are retarded nearly 90 electrical degrees with respect to their anode potential for the normal regulating effect so that the current drawn through these valves is substantially 90 degrees lagging with respect to the potential of the alternating current circuit 11. Obviously, this auxiliary rectifier may be energized from the winding 16 as illustrated or from the winding 15, or from an auxiliary winding, such as the winding 27 of Figs. 1 and 2, according to the desired voltage ratios of the circuit.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a source of direct current, an alternating current load circuit subject to substantial load variations, energy converting means comprising an inductive winding and a plurality of electric valves for transmitting energy therebetween, means for independently loading said converting means for controlling the voltage thereof, and means responsive to an electrical condition of said converting means for regulating said loading means.

2. In combination, a source of direct current, an alternating current load circuit subject to substantial load variations, energy converting means comprising an inductive winding and a plurality of electric valves for transmitting energy therebetween, means for independently loading said converting means for controlling the voltage thereof, rectifying means for producing a unidirectional potential proportional to that of said alternating current circuit, and means for regulating said loading means in accordance with the difference between said rectified potential and that of said direct current circuit.

3. In combination, a source of direct current, an alternating current load circuit subject to substantial load variations, energy converting means comprising an inductive winding and a plurality of electric valves for transmitting energy therebetween, means for independently loading said converting means for controlling the voltage thereof, said loading means including a saturable inductive device, and means for varying the saturation of said inductive device in accordance with variations in an electrical condition of said converting means.

4. In combination, a source of direct current, an alternating current load circuit subject to substantial load variations, energy converting means comprising an inductive winding and a plurality of electric valves for transmitting energy therebetween, means for independently loading said converting means for controlling the voltage thereof, said loading means including a saturable inductive device, rectifying means for producing a unidirectional voltage proportional to that of said alternating current circuit, and means for saturating said inductive device in accordance with the difference between the rectified voltage and that of said direct current circuit.

5. In combination, a source of direct current, an alternating current load circuit subject to substantial load variations, energy converting means comprising an inductive winding and a plurality of electric valves for transmitting energy therebetween, variable impedance means connected in parallel relation with said load circuit for controlling the voltage thereof, and means responsive to an electrical condition of said converting means for varying said impedance means.

6. In combination, a source of direct current, an alternating current load circuit subject to substantial load variations, energy converting means comprising an inductive winding and a plurality of electric valves for transmitting energy therebetween, an inductance device connected across said load circuit for controlling the voltage thereof, said inductance device being provided with a saturating winding, rectifying means energized from said load circuit, and a circuit for energizing said saturating winding with the difference between the voltage of said direct current circuit and that of said rectifying means.

7. In combination, a source of direct current, an alternating current load circuit subject to substantial load variations, energy converting means comprising an inductive winding and a plurality of electric valves for transmitting energy therebetween, rectifying means for loading said alternating current circuit to control the voltage thereof, and means responsive to an electrical condition of said alternating current circuit for controlling said rectifying means.

8. In combination, a source of direct current, an alternating current load circuit subject to substantial load variations, energy converting means comprising an inductive winding and a plurality of electric valves for transmitting energy from said direct current circuit to said alternating current circuit, a grid controlled electric valve rectifier for loading said alternating current circuit to control the voltage thereof, means for applying an alternating potential to the grids of said valve rectifier, and means responsive to the voltage of said alternating current circuit for varying the phase of said grid potential.

9. In combination, a source of direct current, an alternating current load circuit subject to substantial load variations, energy converting means comprising an inductive winding and a plurality of electric valves for transmitting energy from said direct current circuit to said alternating current circuit, a grid controlled vapor electric rectifier for loading said alternating current circuit to control the voltage thereof, a control circuit for said rectifier including a saturable grid transformer energized from said alternating current circuit, and means for varying the saturation of said transformer in accordance with variations in the voltage of said alternating current circuit.

10. In combination, a source of direct current, an alternating current load circuit subject to substantial load variations, energy converting means comprising an inductive winding and a plurality of electric valves for transmitting energy from said direct current circuit to said alternating current circuit, rectifying means for simultaneously transmitting energy from said alternating current circuit to said direct current circuit to control the voltage of said alterating current circuit, and means responsive to the voltage of said alternating current circuit for controlling said rectifying means.

11. In combination, a source of direct current, an alternating current load circuit subject to substantial load variations, energy converting means comprising an inductive winding and a plurality of electric valves for transmitting energy therebetween, an impedance device, rectifying apparatus energized from said alternating current circuit and short-circuited through said impedance device to control the voltage of said alternating current circuit, and means responsive to the voltage of said alternating current circuit for controlling said rectifying means.

BURNICE D. BEDFORD.